Aug. 12, 1924.  
G. V. ANDERSON  
1,504,307  
MACHINE FOR FORMING GROOVES  
Filed Feb. 18, 1921  
2 Sheets-Sheet 1

Inventor:
Gilbert V. Anderson,
By Bushe + Denny
Attorneys

Aug. 12, 1924.  
G. V. ANDERSON  
1,504,307  
MACHINE FOR FORMING GROOVES  
Filed Feb. 18, 1921  2 Sheets-Sheet 2

Inventor:  
Gilbert V. Anderson,  
By Butler & Denny  
Attorneys

Patented Aug. 12, 1924.

1,504,307

UNITED STATES PATENT OFFICE.

GILBERT V. ANDERSON, OF PHILADELPHIA, PENNSYLVANIA, ASSIGNOR TO WILLIAM F. FISCHER, OF PHILADELPHIA, PENNSYLVANIA.

MACHINE FOR FORMING GROOVES.

Application filed February 18, 1921. Serial No. 446,103.

*To all whom it may concern:*

Be it known that I, GILBERT V. ANDERSON, a citizen of the United States, residing at Philadelphia, in the county of Philadelphia and State of Pennsylvania, have invented certain Improvements in Machines for Forming Grooves, of which the following is a specification.

The present invention is an improvement upon the machine of the patent to William F. Fischer, No. 1,343,554, dated June 15, 1920, and it is designed primarily for effecting a reciprocating movement of a cutting tool in coordination with a rotary movement of a surface of revolution to form a closed spiral comprising loops approximately symmetrical with relation to a point at the intersection of reverse curves comprised therein.

More generally, the improvements effect a compensation in the movement of a reciprocating device by a connecting rod operated by an arm revolving about a center, for the purpose of producing an effect similar to that of a connecting rod of infinite length operated by a revolving arm of finite length, or of a connecting rod reciprocated in a straight line.

While the improvements are designed primarily for producing symmetrical closed spiral grooves, as in tubular bearings, it will be understood that the application thereof is not limited to such use.

Figure 1:
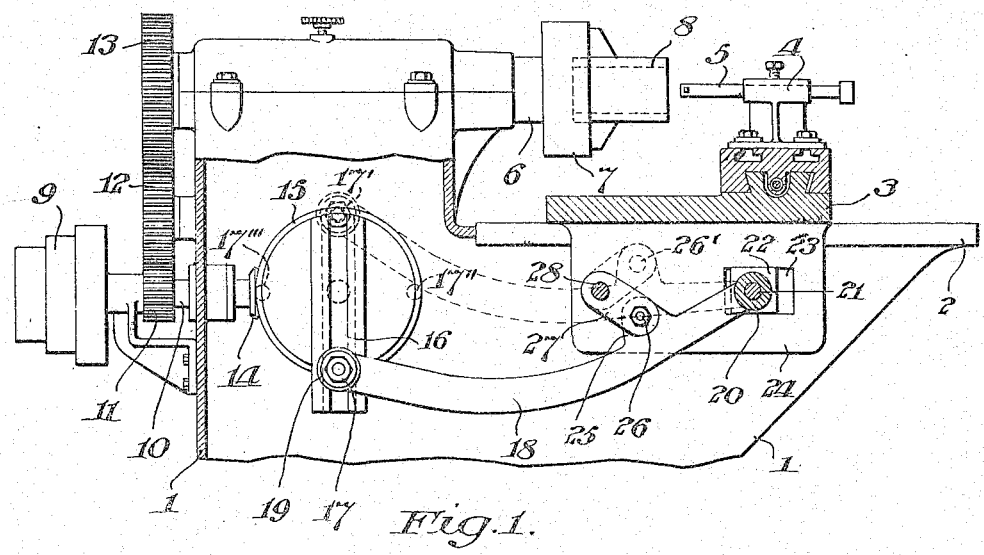
Figure 2:
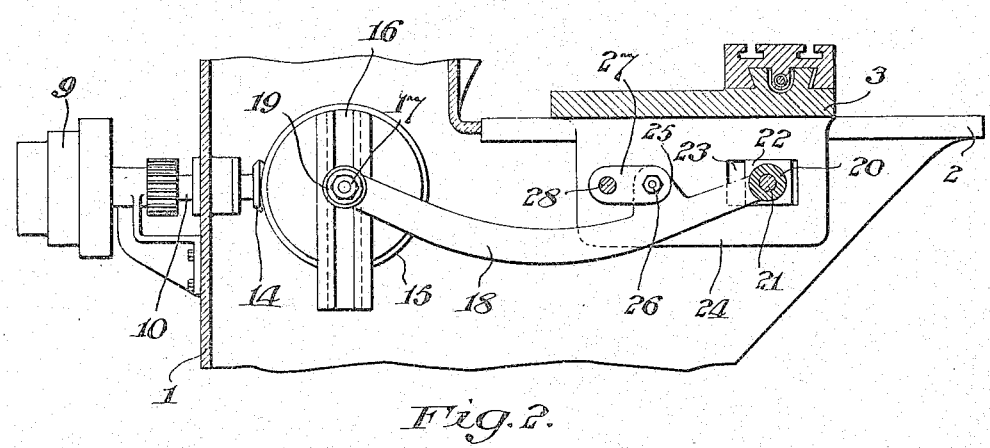
Figure 3:
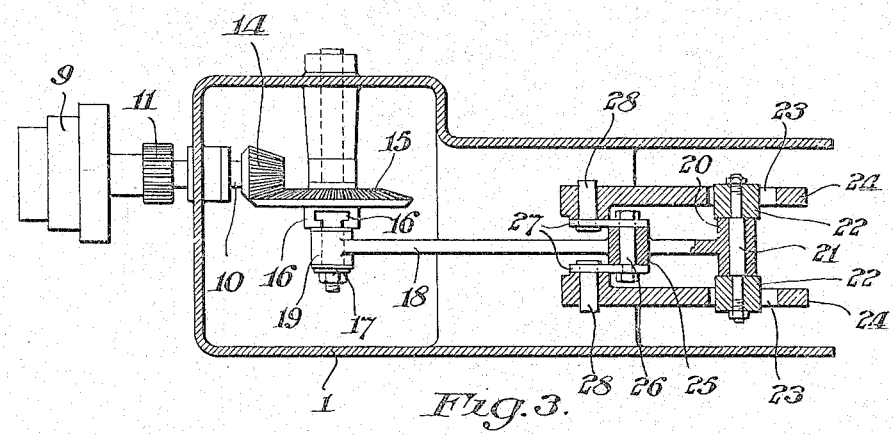
Figure 4:
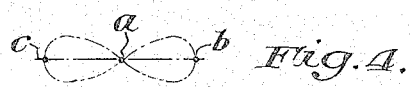
Figure 5:
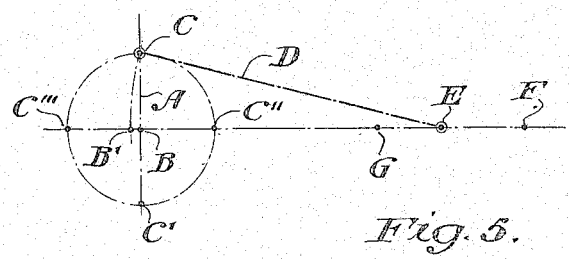
Figure 6:
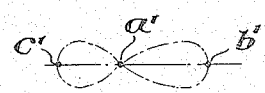

In the drawings, Fig. 1 is a broken part sectional elevation of apparatus embodying my invention; Fig. 2 is a broken part sectional elevation of a second position of mechanism illustrated in Fig. 1; Fig. 3 is an irregular sectional plan view of features shown in Fig. 2; Fig. 4 is a projection of a closed spiral such as is formed in a revolving curved surface by the mechanism shown in Fig. 1; Fig. 5 is a diagrammatic view in illustration of a rotating arm acting through an eccentric point upon a connecting rod having a point movable in a straight line; Fig. 6 is a projection of a closed spiral such as is formed in a revolving cylinder by the reciprocation of a cutting tool through the action of a connecting rod and revolving arm as illustrated in Fig. 5.

In accordance with my improvements, as illustrated in Figs, 1, 2 and 3, the forming machine frame 1 is provided with the way or ways 2 on which a carriage 3 is adapted to reciprocate the tool post 4 and a tool 5 fixed therein. A spindle 6, journalled in the frame, is provided with a chuck 7 for holding a tubular bushing or bearing 8, which is revolved as the cutting tool is reciprocated in contact therewith, to form therein the spiral groove for holding a lubricant and having the form as shown in Fig. 4.

The spindle 6 is revolved, in the form of the mechanism here illustrated, by power applied through one of the sections of the differential pulley 9 fixed on a shaft 10, which is journalled in the frame. The shaft acts through a pinion 11 fixed thereon, an idler gear 12 journalled relatively to the frame and a gear wheel 13 fixed on the spindle 6, the tubular bushing or bearing being rotated thereby.

The shaft 10, in the form of the mechanism illustrated, has fixed thereon a beveled pinion 14 which meshes with a beveled gear 15, journalled in the frame and provided with the undercut diametrical way 16. A pin or stub spindle 17 is set in the way 16 at the desired distance from the axis of the wheel, to provide a power or crank arm of the desired length.

A connecting rod 18 has a bearing 19 at one end thereof connected with the pin 17 and a bearing 20 at the other end thereof connected with the pin 21, the latter being fixed to the blocks 22. These blocks have a limited movement in ways 23 formed in webs 24 depending from the carriage 3. The connecting rod 18 is provided with the further bearing 25, intermediate its end bearings 19 and 20 and in line therewith, in which is disposed a pin 26 carried by arms 27, the latter being carried by and adapted to oscillate through a limited arc relative to the axes of journals 28 supported by the webs 24.

In the operation of this device, as illustrated in Fig. 1, the movement of the wheel 15 through a half revolution moves the connecting rod 18, the blocks 22 and the arms 27 from the full to the dotted line position. As these blocks reciprocate relatively to the carriage 3, the latter is reciprocated by the action of the connecting rod 18 through the rocking arms 27, the connecting pin 26 describing a circular arc 26—26′ as the pin 19 describes the complementary semicircles 17—17′. The result is to shorten the stroke effected by the movement of the pin 17 through the position 17″, the radius of the arc described by the pin 17 being larger than that described by the pin 26 to effect the movement. As the pin 26 is moved thus through its complete arc the tool 5 forms the loop $a$—$b$ passing from the point $a$ through the point $b$ back to the point $a$. In the movement of the pin 17 between its positions 17 and 17′ through the position 17‴, the pin 26 moves back through its arc from the position 26′ to the position 26, the tool 5 forming the loop $a$—$c$.

The correction thus obtained by the use of an oscillatory connecting rod of different effective lengths in producing the two loops of the spiral, will be understood by reference to Figs. 5 and 6. Consider that an arm or radius A, revoluble about an axis B, is joined by a pin C to a connecting rod D which reciprocates a pin E between the points F and G, the distance F—G being the diameter of the circle described by C. As the point C moves to the point C′ through the point C″, the point E moves to the point F and back to its original position, and as the point C moves in the complementary semicircle, through the point C‴, the point E moves to the point G and back to its original position. The distance between the points E and F is greater than the radius A by the distance B—B′ and the distance between the points E and G is less than this radius by the distance B—B′. If the point E be reciprocated along a revolving cylindrical surface it will describe the curve $a'$—$b'$—$c'$ in which the major axis of the loop $a'$—$b'$ is equal to the distance E—F and the major axis of the curve $a'$—$c'$ is equal to the distance E—G. Consequently, in order to form the spiral $a$—$b$—$c$, symmetrical with reference to the point $a$ or with loop of approximately the same dimensions, it is necessary to effect an automatic adjustment of the effective length of the oscillatory connecting rod as its operating arm makes a complete revolution, as in my invention.

Having described my invention, I claim:

1. In a forming machine, the combination of a rotary member, a reciprocating member, and oscillatory mechanism whereby said rotary member operates said reciprocating member, and means connecting said oscillatory mechanism with said reciprocating mechanism for automatically adjusting the stroke of said reciprocating member relatively to the movement of said rotary member.

2. In a forming machine, the combination of a rotary member, a reciprocating member, and mechanism whereby said rotary member operates said reciprocating member, said mechanism comprising an oscillatory device connected eccentrically to said rotary member, an oscillatory device connected to said reciprocating member, and means for pivotally connecting said devices.

3. In a forming machine, the combination of a rotary member, a rod connected therewith, a reciprocatory device, means movable relatively to said device for connecting said rod thereto, an arm having a rocking connection with said device, and a pivotal connection between said rod and arm, whereby the movement of said device by the revolution of said member is automatically adjusted.

4. In a forming machine, the combination of a rotary spindle, a reciprocatory tool carrying mechanism, and means connecting said spindle and mechanism to operate them in coordinate relation, said means comprising a rotary member, a rod connected eccentrically to said member, a rocking arm connected with said mechanism, and a connection between said rod and arm.

5. In a forming machine, the combination with a frame, of a rotary spindle having means for holding work, a rotary device, means for revolving said spindle and device together, a connecting rod operated by said device, a reciprocatory tool carrying mechanism supported by said frame, a rocking arm connected with said mechanism, a pivotal connection between said rod and arm, and guiding means connecting said rod and mechanism.

Signed at Philadelphia, in the county of Philadelphia and State of Pennsylvania, this 15th day of February, 1921.

GILBERT V. ANDERSON.